United States Patent
Lee et al.

(10) Patent No.: US 10,240,038 B2
(45) Date of Patent: *Mar. 26, 2019

(54) FLAME RESISTANT POLYCARBATE BASED RESIN COMPOSITION AND MOLDED ARTICLES THEREOF

(71) Applicant: LG CHEM, LTD., Seoul (KR)

(72) Inventors: Moo Seok Lee, Daejeon (KR); Ryul Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 37 days.

This patent is subject to a terminal disclaimer.

(21) Appl. No.: 15/516,818

(22) PCT Filed: Dec. 4, 2015

(86) PCT No.: PCT/KR2015/013245
§ 371 (c)(1),
(2) Date: Apr. 4, 2017

(87) PCT Pub. No.: WO2016/089170
PCT Pub. Date: Jun. 9, 2016

(65) Prior Publication Data
US 2017/0292019 A1  Oct. 12, 2017

(30) Foreign Application Priority Data

Dec. 4, 2014 (KR) .................. 10-2014-0173005
Dec. 3, 2015 (KR) .................. 10-2015-0171776

(51) Int. Cl.
| | | |
|---|---|---|
| C08L 69/00 | (2006.01) | |
| C08K 5/42 | (2006.01) | |
| C08G 64/08 | (2006.01) | |
| C08G 64/18 | (2006.01) | |
| C08G 64/38 | (2006.01) | |
| C08G 77/448 | (2006.01) | |
| C08J 5/00 | (2006.01) | |
| C08G 64/16 | (2006.01) | |
| C08G 64/06 | (2006.01) | |
| C08G 64/30 | (2006.01) | |
| C08K 5/3475 | (2006.01) | |
| C08L 83/04 | (2006.01) | |
| C08G 64/24 | (2006.01) | |
| C08L 83/10 | (2006.01) | |
| C08K 5/00 | (2006.01) | |
| C08G 64/22 | (2006.01) | |
| C08G 77/14 | (2006.01) | |
| C08L 83/06 | (2006.01) | |
| C08J 5/08 | (2006.01) | |
| C08K 5/521 | (2006.01) | |
| C08L 51/04 | (2006.01) | |

(Continued)

(52) U.S. Cl.
CPC ............ *C08L 69/00* (2013.01); *C08G 64/06* (2013.01); *C08G 64/085* (2013.01); *C08G 64/1666* (2013.01); *C08G 64/1691* (2013.01); *C08G 64/18* (2013.01); *C08G 64/186* (2013.01); *C08G 64/22* (2013.01); *C08G 64/24* (2013.01); *C08G 64/307* (2013.01); *C08G 64/38* (2013.01); *C08G 77/14* (2013.01); *C08G 77/20* (2013.01); *C08G 77/448* (2013.01); *C08J 5/00* (2013.01); *C08J 5/08* (2013.01); *C08K 5/005* (2013.01); *C08K 5/3475* (2013.01); *C08K 5/42* (2013.01); *C08K 5/521* (2013.01); *C08L 51/04* (2013.01); *C08L 69/005* (2013.01); *C08L 83/04* (2013.01); *C08L 83/06* (2013.01); *C08L 83/10* (2013.01); *C09K 21/14* (2013.01); *C08K 3/40* (2013.01); *C08K 5/0066* (2013.01); *C08K 7/14* (2013.01); *C08K 2201/003* (2013.01); *C08K 2201/004* (2013.01); *C08K 2201/016* (2013.01); *C08L 2201/08* (2013.01); *C08L 2201/10* (2013.01); *C08L 2205/02* (2013.01); *C08L 2205/025* (2013.01); *C08L 2205/03* (2013.01); *C08L 2205/035* (2013.01); *C08L 2205/05* (2013.01); *C08L 2205/06* (2013.01); *C08L 2207/53* (2013.01); *C09K 21/08* (2013.01)

(58) Field of Classification Search
CPC ......... C08G 64/085; C08L 69/00; C08K 5/42; C08K 5/0066; C09K 21/08
See application file for complete search history.

(56) References Cited

U.S. PATENT DOCUMENTS 3,819,744 A   6/1974  Buechner et al.
5,137,949 A   8/1992  Paul et al.
(Continued)

FOREIGN PATENT DOCUMENTS

CN   101124282 A   2/2008
CN   101585961 A   11/2009
(Continued)

OTHER PUBLICATIONS

Hwang, et al.: "Production of impact strength and fluidity-improved polycarbonate and composition comprising same", Chemical Abstract for US2016/0251481A1, Mar. 24, 2016.
(Continued)

*Primary Examiner* — Richard A Huhn
(74) *Attorney, Agent, or Firm* — Dentons US LLP

(57) ABSTRACT

The present invention provides a flame resistant polycarbonate-based resin composition and molded articles thereof, and specifically, a polycarbonate-based resin composition having excellent heat resistance and impact resistance and improved flame retardancy, and molded articles formed from the polycarbonate-based resin composition.

13 Claims, No Drawings

(51) Int. Cl.
*C09K 21/14* (2006.01)
*C08G 77/20* (2006.01)
*C08K 7/14* (2006.01)
*C08K 3/40* (2006.01)
*C09K 21/08* (2006.01)

(56) References Cited

U.S. PATENT DOCUMENTS

| | | |
|---|---|---|
| 5,324,454 A | 6/1994 | Takata et al. |
| 5,380,795 A | 1/1995 | Gosens et al. |
| 5,455,310 A | 10/1995 | Hoover et al. |
| 5,502,134 A | 3/1996 | Okamoto et al. |
| 5,608,026 A | 3/1997 | Hoover et al. |
| 5,783,651 A | 7/1998 | Konig et al. |
| 5,932,677 A | 8/1999 | Hoover et al. |
| 6,001,929 A | 12/1999 | Nodera et al. |
| 6,252,013 B1 | 6/2001 | Banach et al. |
| 6,281,286 B1 | 8/2001 | Chorvath et al. |
| 6,780,956 B2 | 8/2004 | Davis |
| 7,135,538 B2 | 11/2006 | Glasgow et al. |
| 7,332,559 B2 | 2/2008 | Hong et al. |
| 7,432,327 B2 | 10/2008 | Glasgow |
| 7,498,401 B2 | 3/2009 | Agarwal |
| 7,524,919 B2 | 4/2009 | Hoover et al. |
| 7,691,304 B2 | 4/2010 | Agarwal et al. |
| 7,709,581 B2 | 5/2010 | Glasgow et al. |
| 7,718,733 B2 | 5/2010 | Juikar et al. |
| 8,030,379 B2 | 10/2011 | Nodera et al. |
| 8,084,134 B2 | 12/2011 | Malinoski et al. |
| 8,124,683 B2 | 2/2012 | Jung et al. |
| 8,389,648 B2 | 3/2013 | Adoni et al. |
| 8,466,249 B2 | 6/2013 | Gallucci et al. |
| 8,552,096 B2 | 10/2013 | Li et al. |
| 8,912,290 B2 | 12/2014 | Huggins et al. |
| 8,933,186 B2 | 1/2015 | Bahn et al. |
| 8,962,780 B2 | 2/2015 | Higaki et al. |
| 8,981,017 B2 | 3/2015 | Ishikawa |
| 9,062,164 B2 | 6/2015 | Kim et al. |
| 9,080,021 B2 | 7/2015 | Ishikawa et al. |
| 9,102,832 B2 | 8/2015 | Sybert et al. |
| 9,255,179 B2 | 2/2016 | Park et al. |
| 9,505,929 B2 | 11/2016 | Natarajan et al. |
| 9,580,597 B2* | 2/2017 | Jeong ............... C08G 64/24 |
| 9,718,958 B2* | 8/2017 | Son ............... C08G 64/24 |
| 9,745,417 B2* | 8/2017 | Hwang ............... C08G 64/24 |
| 9,745,466 B2* | 8/2017 | Park ............... C08G 64/24 |
| 9,751,979 B2* | 9/2017 | Son ............... C08G 64/24 |
| 9,809,677 B2* | 11/2017 | Park ............... C08G 64/24 |
| 9,840,585 B2* | 12/2017 | Park ............... C08G 64/24 |
| 9,969,841 B2* | 5/2018 | Hwang ............... C08G 77/448 |
| 2003/0027905 A1 | 2/2003 | Mahood et al. |
| 2003/0065122 A1 | 4/2003 | Davis |
| 2004/0200303 A1 | 10/2004 | Inoue et al. |
| 2006/0148986 A1 | 7/2006 | Glasgow et al. |
| 2007/0093629 A1 | 4/2007 | Silva et al. |
| 2007/0135569 A1 | 6/2007 | Derudder |
| 2007/0241312 A1 | 10/2007 | Hikosaka |
| 2007/0258412 A1 | 11/2007 | Schilling et al. |
| 2008/0015289 A1 | 1/2008 | Siripurapu |
| 2008/0081895 A1 | 4/2008 | Lens et al. |
| 2008/0230751 A1 | 9/2008 | Li et al. |
| 2009/0087761 A1 | 4/2009 | Fukushima et al. |
| 2009/0326183 A1 | 12/2009 | Schultz et al. |
| 2010/0233603 A1 | 9/2010 | Hikosaka |
| 2012/0123034 A1 | 5/2012 | Morizur et al. |
| 2012/0251750 A1 | 10/2012 | Sybert et al. |
| 2012/0252985 A1* | 10/2012 | Rosenquist ............. C08L 69/00 525/439 |
| 2012/0271009 A1 | 10/2012 | Higaki et al. |
| 2012/0283393 A1 | 11/2012 | Ishikawa |
| 2013/0035441 A1 | 2/2013 | De Brouwer et al. |
| 2013/0082222 A1 | 4/2013 | Aoki |
| 2013/0186799 A1 | 7/2013 | Stam et al. |
| 2013/0190425 A1 | 7/2013 | Zhu et al. |
| 2013/0267665 A1 | 10/2013 | Huggins et al. |
| 2013/0274392 A1 | 10/2013 | Morizur et al. |
| 2013/0289224 A1 | 10/2013 | Bae et al. |
| 2013/0309474 A1 | 11/2013 | Peek et al. |
| 2013/0313493 A1 | 11/2013 | Wen et al. |
| 2013/0317142 A1 | 11/2013 | Chen et al. |
| 2013/0317146 A1 | 11/2013 | Li et al. |
| 2013/0317150 A1 | 11/2013 | Wan et al. |
| 2013/0331492 A1 | 12/2013 | Sharma |
| 2014/0106208 A1 | 4/2014 | Ishikawa et al. |
| 2014/0148559 A1 | 5/2014 | Kim et al. |
| 2014/0179843 A1 | 6/2014 | Van Der Mee et al. |
| 2014/0206802 A1 | 7/2014 | Bahn et al. |
| 2014/0323623 A1 | 10/2014 | Miyake et al. |
| 2015/0057423 A1 | 2/2015 | Kim et al. |
| 2015/0175802 A1 | 6/2015 | Sybert et al. |
| 2015/0197633 A1 | 7/2015 | Van Der Mee et al. |
| 2015/0210854 A1 | 7/2015 | Aoki |
| 2015/0218371 A1 | 8/2015 | Lee et al. |
| 2015/0307706 A1 | 10/2015 | Rosenquist et al. |
| 2015/0315380 A1* | 11/2015 | Bahn ............... C08L 83/04 524/352 |
| 2015/0344623 A1* | 12/2015 | Park ............... C08G 64/1666 528/29 |
| 2015/0368484 A1 | 12/2015 | Shishaku et al. |
| 2016/0002410 A1 | 1/2016 | Iyer et al. |
| 2016/0017102 A1 | 1/2016 | Yamada |
| 2016/0122477 A1 | 5/2016 | Rhee et al. |
| 2016/0251481 A1 | 9/2016 | Hwang et al. |
| 2016/0297926 A1* | 10/2016 | Hwang ............... C08G 77/448 |
| 2016/0319127 A1* | 11/2016 | Jeong ............... C08G 64/24 |
| 2016/0326312 A1 | 11/2016 | Park et al. |
| 2016/0326313 A1* | 11/2016 | Son ............... C08G 64/24 |
| 2016/0326314 A1* | 11/2016 | Son ............... C08G 64/24 |
| 2016/0326321 A1* | 11/2016 | Park ............... C08G 64/24 |
| 2016/0369047 A1* | 12/2016 | Hwang ............... C08G 64/24 |
| 2016/0369048 A1 | 12/2016 | Park et al. |
| 2016/0369095 A1* | 12/2016 | Park ............... C08G 64/24 |
| 2016/0376405 A1* | 12/2016 | Park ............... C08G 64/24 525/450 |
| 2017/0137568 A1* | 5/2017 | Chun ............... C08G 64/24 |
| 2017/0298221 A1* | 10/2017 | Son ............... C08G 64/24 |
| 2017/0306146 A1* | 10/2017 | Lee ............... C08G 64/24 |
| 2017/0321014 A1* | 11/2017 | Lee ............... C08G 64/24 |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |

(56) References Cited

FOREIGN PATENT DOCUMENTS

| | | |
|---|---|---|
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 2015-163722 A | 9/2015 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 10-2008-0083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 101563269 B1 | 10/2015 |
| KR | 1020150119823 A | 10/2015 |
| KR | 2015-0134457 A | 12/2015 |
| KR | 101664844 B1 | 10/2016 |
| TW | 201241043 A | 10/2012 |
| WO | 2012/060516 A1 | 5/2012 |
| WO | 2013/051557 A | 4/2013 |
| WO | 2013/058214 A1 | 4/2013 |
| WO | 2013-073709 A1 | 5/2013 |
| WO | 2013-100606 A1 | 7/2013 |
| WO | 2013-115538 A1 | 8/2013 |
| WO | 2013/115604 A1 | 8/2013 |
| WO | 2013/175445 A2 | 11/2013 |
| WO | 2013175455 A1 | 11/2013 |
| WO | 2014/042252 A1 | 3/2014 |
| WO | 2014/058033 A1 | 4/2014 |
| WO | 2014/119827 A1 | 8/2014 |
| WO | 2014-139110 A1 | 9/2014 |
| WO | 2014/144673 A1 | 9/2014 |
| WO | 2014179206 A2 | 11/2014 |
| WO | 2015/011669 A2 | 1/2015 |
| WO | 2015/015445 A2 | 2/2015 |
| WO | 2015/041441 A1 | 3/2015 |
| WO | 2015/087595 A1 | 6/2015 |

OTHER PUBLICATIONS

Chemical Abstract registry No. 163617-00-3, Jun. 8, 1995.

\* cited by examiner

FLAME RESISTANT POLYCARBATE BASED RESIN COMPOSITION AND MOLDED ARTICLES THEREOF

CROSS-REFERENCE TO RELATED APPLICATIONS

This application is a National Stage Entry of International Application No. PCT/KR2015/013245, filed on Dec. 4, 2015, and claims the benefit of and priority to Korean Application No. 10-2014-0173005, filed on Dec. 4, 2014, and Korean Application No. 10-2015-0171776, filed on Dec. 3, 2015, all of which are hereby incorporated by reference in their entirety for all purposes as if fully set forth herein.

TECHNICAL FIELD

The present invention relates to a polycarbonate-based resin composition and molded articles thereof.

More specifically, the present invention relates to a polycarbonate-based resin composition having excellent heat resistance and impact resistance and improved flame retardancy, and molded articles thereof.

BACKGROUND OF ART

Polycarbonate resins are thermoplastic resin formed by condensation-polymerization of an aromatic diol such as bisphenol A with a carbonate precursor such as a phosgene and have excellent impact strength, dimensional stability, heat resistance, and transparency. Thus, the polycarbonate resins have application in a wide range of uses, such as exterior materials of electrical and electronic products, automobile components, building materials, and optical components.

Recently, in order to apply these polycarbonate resins to more various fields, many studies have been made to obtain desired physical properties by copolymerizing two or more aromatic diol compounds having different structures from each other and introducing monomers having different structures into a main chain of the polycarbonate.

In particular, studies for introducing a polysiloxane structure into a main chain of the polycarbonate have been undertaken.

However, most of these technologies have disadvantages in that economic efficiency is deteriorated due to high production costs, and when chemical resistance or impact strength of the polycarbonate resin is improved, YI (yellow index), etc., are deteriorated.

Meanwhile, a general polycarbonate resin has poor flame retardancy corresponding to a V-2 rating according to UL 94 V Test (vertical burning test).

However, exterior materials of electrical and electronic products, automobile components, etc., generally require high flame retardancy of a V-0 rating.

Accordingly, in order to manufacture a polycarbonate-based resin product satisfying high flame retardancy of a V-0 rating, a flame retardant should be used.

In general, the flame retardant applied to the polycarbonate-based resin includes a bromine-based flame retardant, a metal salt flame retardant, a phosphorus-based flame retardant, etc.

Among them, the bromine-based flame retardant is classified into environmental hormones and carcinogenic materials, such that the use of the bromine-based flame retardant is regulated. The phosphorus-based flame retardant having excellent flame retardancy for its cost has been the most largely adopted.

However, when the flame retardant is applied, impact resistance and heat resistance of the polycarbonate-based resin are relatively deteriorated, such that an amount of the flame retardant to be required should be limited.

Therefore, there has been a limitation in that a balance needs to be found between flame retardancy and other physical properties at an appropriate level together with securing flame retardancy of the polycarbonate-based resin until now.

As described above, a technology for simultaneously improving other physical properties in trade-off relationship with the flame retardancy of the polycarbonate-based resin has been urgently demanded.

The above information disclosed in this Background section is only for enhancement of understanding of the background of the invention and therefore it may contain information that does not form the prior art that is already known in this country to a person of ordinary skill in the art.

DETAILED DESCRIPTION OF THE INVENTION

Technical Problem

The present invention has been made in an effort to provide a polycarbonate-based resin composition having excellent heat resistance and impact resistance as well as improved flame retardancy.

In addition, the present invention has been made in an effort to provide molded articles formed from the polycarbonate-based resin composition.

Technical Solution

An exemplary embodiment of the present invention provides a flame resistant polycarbonate-based resin composition including:

a polycarbonate resin including an aromatic polycarbonate-based first repeating unit;

a copolycarbonate resin including the aromatic polycarbonate-based first repeating unit and one or more aromatic polycarbonate-based second repeating unit having siloxane bonds; and an organic metal salt-based flame retardant, wherein the first repeating unit each independently includes a repeating unit represented by Chemical Formula 1 below, and the second repeating unit includes a repeating unit represented by Chemical Formula 3 below:

[Chemical Formula 1]

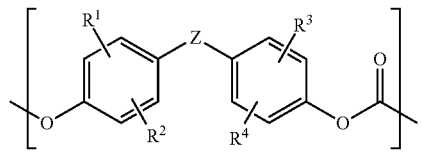

wherein, in Chemical Formula 1, $R^1$ to $R^4$ are each independently hydrogen, a $C_{1-10}$ alkyl, a $C_{1-10}$ alkoxy, or a halogen, Z is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO;

[Chemical Formula 3]

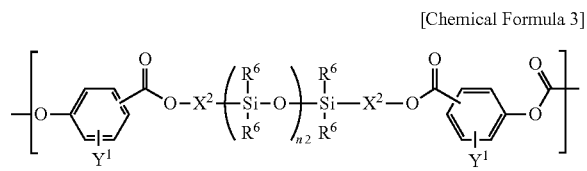

wherein, in Chemical Formula 3, each $X^2$ is independently a $C_{1-10}$ alkylene, each $Y^1$ is independently hydrogen, a $C_{1-6}$ alkyl, a halogen, a hydroxy, a $C_{1-6}$ alkoxy, or a $C_{6-20}$ aryl, each $R^6$ is independently hydrogen, a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and n2 is an integer of 10 to 200.

Another embodiment of the present invention provides molded articles formed from the flame resistant polycarbonate-based resin composition.

Hereinafter, the flame resistant polycarbonate-based resin composition according to specific exemplary embodiments of the present invention and the molded articles thereof are described in more detail.

The technical terms used in the present specification are intended to describe specific exemplary embodiments, but should not be interpreted as limiting the present invention.

In addition, singular forms used herein include plural forms unless the phrases have clearly opposite meanings.

In addition, 'including' or 'containing' used in the present specification specifies specific characteristics, regions, integers, steps, operations, elements, or components, but it does not exclude the addition of other specific characteristics, regions, integers, steps, operations, elements, or components.

Further, terms including ordinal numbers such as 'first', 'second', etc., in the present specification are used to distinguish one constituent element from other constituent elements, and are not limited by the ordinal numbers. For example, the first constituent elements may be referred to as the second constituent elements within the scope range of the present invention, and similar to this, the second constituent elements may be referred to as the first constituent elements.

I. Polycarbonate-Based Resin Composition

According to an exemplary embodiment of the present invention, a flame resistant polycarbonate-based resin composition including: a polycarbonate resin including an aromatic polycarbonate-based first repeating unit;

a copolycarbonate resin including the aromatic polycarbonate-based first repeating unit and one or more aromatic polycarbonate-based second repeating unit having siloxane bonds; and an organic metal salt-based flame retardant is provided, wherein each first repeating unit independently includes a repeating unit represented by Chemical Formula 1 below, and the second repeating unit includes a repeating unit represented by Chemical Formula 3 below:

[Chemical Formula 1]

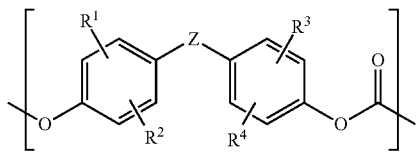

wherein, in Chemical Formula 1, $R^1$ to $R^4$ are each independently hydrogen, a $C_{1-10}$ alkyl, a $C_{1-10}$ alkoxy, or a halogen, Z is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO;

[Chemical Formula 3]

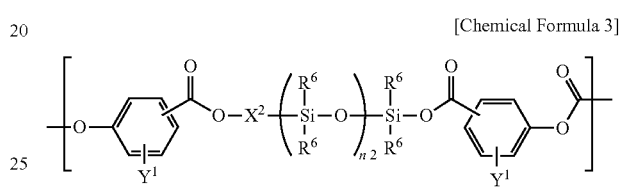

wherein, in Chemical Formula 3, each $X^2$ is independently a $C_{1-10}$ alkylene, each $Y^1$ is independently hydrogen, a $C_{1-6}$ alkyl, a halogen, hydroxy, a $C_{1-6}$ alkoxy, or a $C_{6-20}$ aryl, each $R^6$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and n2 is an integer of 10 to 200.

As results from continuous research of the present inventors, it was confirmed that the copolycarbonate resin in which a specific siloxane bond is introduced into a main chain of a polycarbonate was capable of supplementing physical properties of the polycarbonate resin, to have particularly and remarkably improved heat resistance and impact strength.

Particularly, it was confirmed that the copolycarbonate resin could minimize deterioration in physical properties of the resin composition due to the addition of the organic metal salt-based flame retardant, such that it is possible to provide the polycarbonate-based resin composition having high flame retardancy of a V-O rating according to the UL 94 V Test while having excellent heat resistance and impact resistance.

Hereinafter, components that may be included in the flame retardant polycarbonate-based resin composition according to an exemplary embodiment of the present invention are described in more detail.

(1) Polycarbonate Resin

The polycarbonate resin is a base resin included in the polycarbonate-based resin composition, and includes an aromatic polycarbonate-based first repeating unit.

Specifically, the aromatic polycarbonate-based first repeating unit is formed by reaction of a diol compound and a carbonate precursor, and preferably, may include a repeating unit represented by Chemical Formula 1 below:

[Chemical Formula 1]

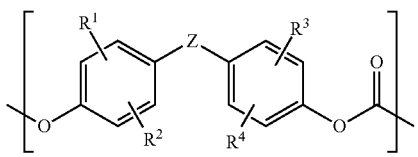

wherein, in Chemical Formula 1, $R^1$ to $R^4$ are each independently hydrogen, a $C_{1-10}$ alkyl, a $C_{1-10}$ alkoxy, or a halogen, and Z is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO.

In Chemical Formula 1, preferably, $R^1$ to $R^4$ are each independently hydrogen, methyl, chloro, or bromo.

In addition, preferably, Z is a linear or branched $C_{1-10}$ alkylene unsubstituted or substituted with a phenyl, and more preferably, methylene, ethane-1,1-diyl, propane-2,2-diyl, butane-2,2-diyl, 1-phenylethane-1,1-diyl, or diphenylmethylene.

Further, preferably, Z is cyclohexane-1,1-diyl, O, S, SO, $SO_2$, or CO.

As non-limiting examples, the repeating unit represented by Chemical Formula 1 may be derived from one or more aromatic diol compounds selected from the group consisting of bis(4-hydroxyphenyl)methane, bis(4-hydroxyphenyl) ether, bis(4-hydroxyphenyl)sulfone, bis(4-hydroxyphenyl) sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl) cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and the carbonate precursor are reacted to form the repeating unit represented by Chemical Formula 1.

As a non-limiting example, when bisphenol A, i.e., the aromatic diol compound, and triphosgene, i.e., the carbonate precursor, are polymerized, the repeating unit represented by Chemical Formula 1 may be represented by Chemical Formula 1-1 below:

[Chemical Formula 1-1]

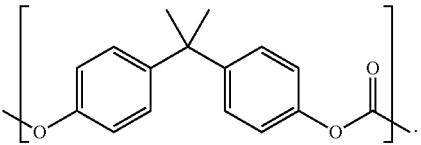

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl) carbonate, phosgene, triphosgene, diphosgene, bromophosgene, and bishaloformate may be used. Preferably, triphosgene or phosgene may be used.

The polycarbonate resin may have a weight average molecular weight of 1,000 to 100,000 g/mol, preferably, 5,000 to 50,000 g/mol.

More preferably, the weight average molecular weight (g/mol) is 1,000 or more, 5,000 or more, 10,000 or more, 21,000 or more, 22,000 or more, 23,000 or more, 24,000 or more, 25,000 or more, 26,000 or more, 27,000 or more, or 28,000 or more.

Further, the weight average molecular weight is 100,000 or less, 50,000 or less, 34,000 or less, 33,000 or less, or 32,000 or less.

In addition, the polycarbonate resin may preferably have a melt index (MI) of 5 g/10 min to 25 g/10 min according to ASTM D1238 (300° C. and 1.2 kg load) in order to stably show physical properties of the composition.

Particularly, it is more preferred that the polycarbonate resin may include two or more polycarbonate resins each having a different melt index (MI) in order to stably show physical properties of the composition.

For example, when the two polycarbonate resins each having a different melt index (MI) are included in the polycarbonate-based resin composition, one polycarbonate resin may preferably have a melt index (MI) of 5 g/10 min to 15 g/10 min, and the other polycarbonate resin may preferably have a melt index (MI) of 16 g/10 min to 25 g/10 min.

For example, when the two polycarbonate resins (a first polycarbonate resin and a second polycarbonate resin) each having a different melt index (MI) are included in the polycarbonate-based resin composition, the second polycarbonate resin having a larger melt index than that of the first polycarbonate resin may preferably have an amount of 150 to 350 parts by weight based on 100 parts by weight of the first polycarbonate resin in order to have the above-described effects.

Preferably, the second polycarbonate resin may have an amount of 150 parts by weight or more, or 160 parts by weight or more, or 170 parts by weight or more based on 100 parts by weight of the first polycarbonate resin.

In addition, the second polycarbonate resin may have an amount of 350 parts by weight or less, or 300 parts by weight or less, or 290 parts by weight or less, 285 parts by weight or less, based on 100 parts by weight of the first polycarbonate resin.

(2) Copolycarbonate Resin

The copolycarbonate resin is an added component to improve physical properties, particularly, heat resistance and impact strength, of the above-described polycarbonate resin, and includes an aromatic polycarbonate-based first repeating unit and one or more aromatic polycarbonate-based second repeating unit having siloxane bonds.

That is, the copolycarbonate resin may be distinguished from the above-described polycarbonate resin in that a polysiloxane structure is introduced into a main chain of the polycarbonate.

[First Repeating Unit]

Specifically, the aromatic polycarbonate-based first repeating unit is formed by reaction of a diol compound and a carbonate precursor, and preferably, may include the above-described repeating unit represented by Chemical Formula 1:

[Chemical Formula 1]

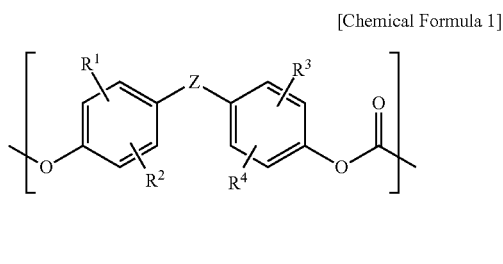

wherein, in Chemical Formula 1, $R^1$ to $R^4$ are each independently hydrogen, a $C_{1-10}$ alkyl, a $C_{1-10}$ alkoxy, or a halogen, and Z is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO.

Here, $R^1$ to $R^4$ and Z may have the same as or different structure from a group corresponding to the above-described repeating unit included in the polycarbonate resin.

As a non-limiting example, when bisphenol A, i.e., the aromatic diol compound, and triphosgene, i.e., the carbonate precursor, are polymerized, the repeating unit represented by Chemical Formula 1 may be represented by Chemical Formula 1-1 below:

[Chemical Formula 1-1]

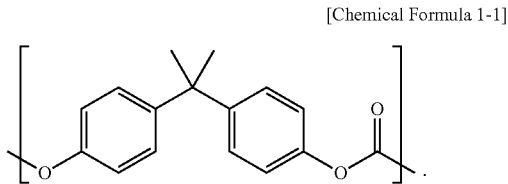

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl) carbonate, phosgene, triphosgene, diphosgene, bromo phosgene, and bishaloformate may be used. Preferably, triphosgene or phosgene may be used.

[Second Repeating Unit]

Meanwhile, the polycarbonate-based second repeating unit having siloxane bonds is formed by reaction of at least one siloxane compound and a carbonate precursor, and preferably, may include a repeating unit represented by Chemical Formula 3 below:

[Chemical Formula 3]

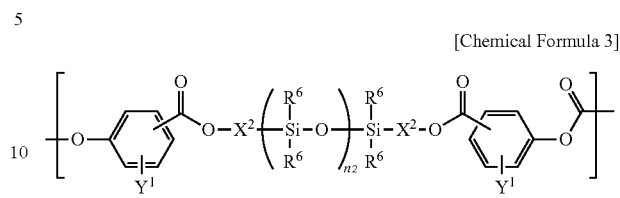

wherein, in Chemical Formula 3, each $X^2$ is independently a $C_{1-10}$ alkylene, each $Y^1$ is independently hydrogen, a $C_{1-6}$ alkyl, a halogen, a hydroxy, a $C_{1-6}$ alkoxy, or a $C_{6-20}$ aryl, each $R^6$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and n2 is an integer of 10 to 200.

In Chemical Formula 3, preferably, each $X^2$ is independently a $C_{2-10}$ alkylene, more preferably, a $C_{2-6}$ alkylene, and most preferably, isobutylene.

Preferably, in Chemical Formula 3, $Y^1$ may be hydrogen.

In Chemical Formula 3, each $R^6$ may independently be hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl.

In addition, preferably, each $R_6$ may independently be a $C_{1-10}$ alkyl, more preferably, a $C_{1-6}$ alkyl, still more preferably, a $C_{1-3}$ alkyl, and most preferably, methyl.

In Chemical Formula 3, n2 is an integer of 10 to 200, and preferably, may be i) an integer of 30 to 60, ii) an integer of 20 or more, 25 or more, 30 or more, 40 or less, or 35 or less, or iii) an integer of 50 or more, 55 or more, 70 or less, 65 or less, or 60 or less.

For example, the repeating unit represented by Chemical Formula 3 may be represented by Chemical Formula 3-1 below:

[Chemical Formula 3-1]

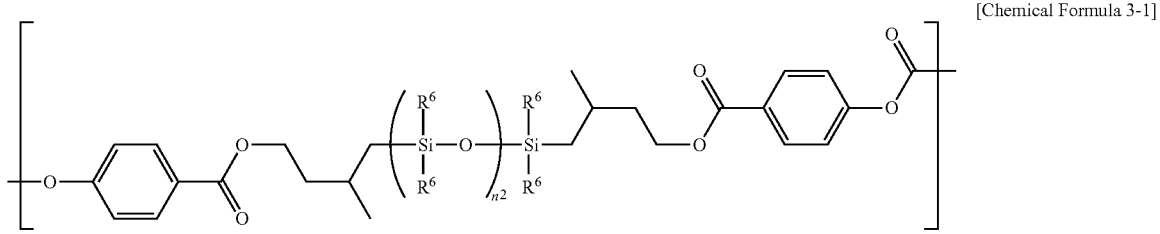

wherein, in Chemical Formula 3-1, $R^6$ and n2 are respectively the same as previously defined in Chemical Formula 3 above.

Further, according to an exemplary embodiment of the present invention, the second repeating unit may further include a repeating unit represented by Chemical Formula 2 below:

[Chemical Formula 2]

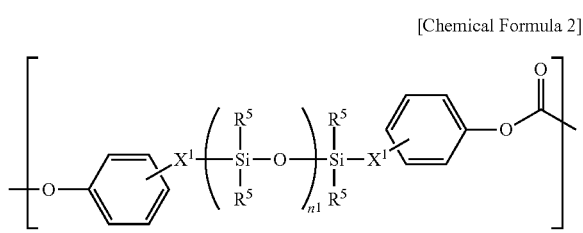

wherein, in Chemical Formula 2,
each $X^1$ is independently a $C_{1-10}$ alkylene,
each $R^5$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and
n1 is an integer of 10 to 200.

In Chemical Formula 2, each $X^1$ is independently a $C_{2-10}$ alkylene, preferably, a $C_{2-4}$ alkylene, and more preferably, propane-1,3-diyl.

The copolycarbonate further including the repeating unit represented by Chemical Formula 2 as the second repeating unit may allow the polycarbonate-based resin composition including the copolycarbonate to have more improved heat resistance and impact resistance.

In Chemical Formula 2, each $R^5$ may independently be hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl.

In addition, preferably, each $R^5$ is independently a $C_{1-10}$ alkyl, more preferably, a $C_{1-6}$ alkyl, still more preferably, a $C_{1-3}$ alkyl, and most preferably, methyl.

In Chemical Formula 2, n1 is an integer of 10 to 200, and preferably, may be i) an integer of 30 to 60, ii) an integer of 20 or more, 25 or more, 30 or more, 40 or less, or 35 or less, or iii) an integer of 50 or more, 55 or more, 70 or less, 65 or less, or 60 or less.

For example, the repeating unit represented by Chemical Formula 2 may be represented by Chemical Formula 2-1 below:

[Chemical Formula 2-1]

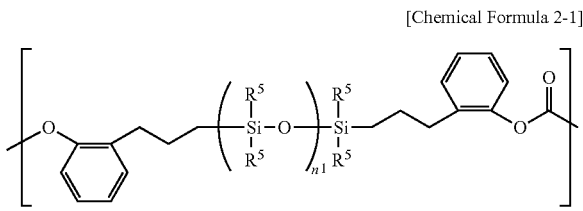

wherein, in Chemical Formula 2-1,
$R^5$ and n1 are respectively the same as previously defined in Chemical Formula 2 above.

Preferably, the second repeating unit may include at least two repeating units selected from the group consisting of the repeating unit represented by Chemical Formula 2 and the repeating unit represented by Chemical Formula 3.

More preferably, the second repeating unit includes a repeating unit represented by Chemical Formula 2 below and a repeating unit represented by Chemical Formula 3 below.

It may be confirmed that at the time of including at least two repeating units in the repeating units represented by Chemical Formulas 2 and 3, improvement of room temperature impact strength, low temperature impact strength, and fluidity are remarkably increased, which is caused from result in which improvement of physical properties complementarily functions by each repeating unit.

As used herein, 'at least two repeating units' means at least two repeating units each having different structures, or at least two repeating units each having the same structure but having a different number of repeating units (n1 or n2) of silicon oxide in the structures of Chemical Formulas 2 and 3.

For example, the 'at least two repeating units' used in the present invention means to include i) one repeating unit represented by Chemical Formula 2 and one repeating unit represented by Chemical Formula 3, ii) one repeating unit represented by Chemical Formula 2 and the other one repeating unit represented by Chemical Formula 2, or iii) one repeating unit represented by Chemical Formula 3 and the other one repeating unit represented by Chemical Formula 3.

Among these examples, the example including i) one repeating unit represented by Chemical Formula 2 and one repeating unit represented by Chemical Formula 3 is the most preferred.

In each case including the at least two repeating units, a weight ratio of the at least two repeating units may be 1:99 to 99:1.

Preferably, the weight ratio of the at least two repeating units may be 3:97 to 97:3, 5:95 to 95:5, 10:90 to 90:10, or 15:85 to 85:15, and more preferably, 20:80 to 80:20.

The repeating unit represented by Chemical Formula 2 and the repeating unit represented by Chemical Formula 3 may be derived from a siloxane compound represented by Chemical Formula 2-2 below and a siloxane compound represented by Chemical Formula 3-2 below, respectively:

[Chemical Formula 2-2]

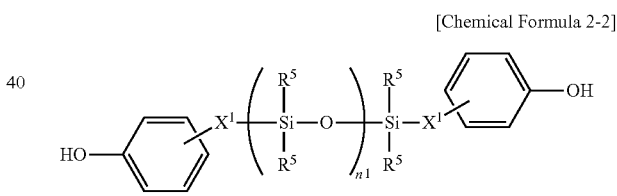

wherein, in Chemical Formula 2-2,
$X^1$, $R^5$, and n1 are respectively the same as previously defined in Chemical Formula 2 above,

[Chemical Formula 3-2]

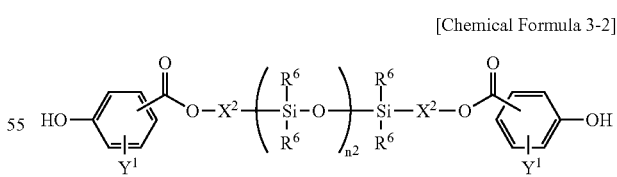

wherein, in Chemical Formula 3-2,
$X^2$, $Y^1$, $R^6$, and n2 are respectively the same as previously defined in Chemical Formula 3 above.

As used herein, 'derived from a siloxane compound' means that a hydroxy group of each of the siloxane compounds and a carbonate precursor are reacted to form the repeating unit represented by Chemical Formula 2 and the repeating unit represented by the Chemical Formula 3, respectively.

Further, descriptions of the carbonate precursors that may be used for the formation of the repeating units represented by Chemical Formulas 2 and 3 are the same as those described for the carbonate precursor that may be used for the formation of the repeating unit represented by Chemical Formula 1 described above.

In addition, the compound represented by Chemical Formula 2-2 and the compound represented by Chemical Formula 3-2 may be prepared by Reaction Schemes 1 and 2, respectively.

[Reaction Scheme 1]

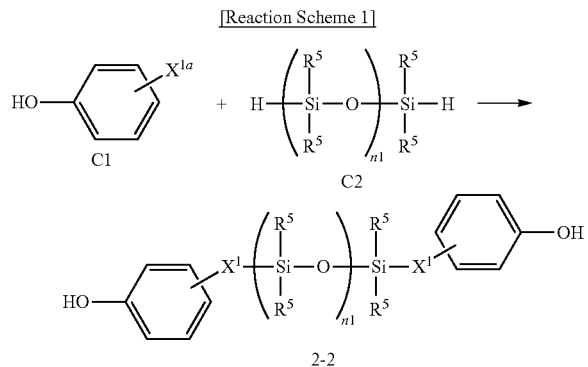

2-2 wherein, in Reaction Scheme 1,
$X^{1a}$ is a $C_{2-10}$ alkenyl, and
$X^1$, $R^5$, and n1 are respectively the same as previously defined in Chemical Formula 2 above; and

[Reaction Scheme 2]

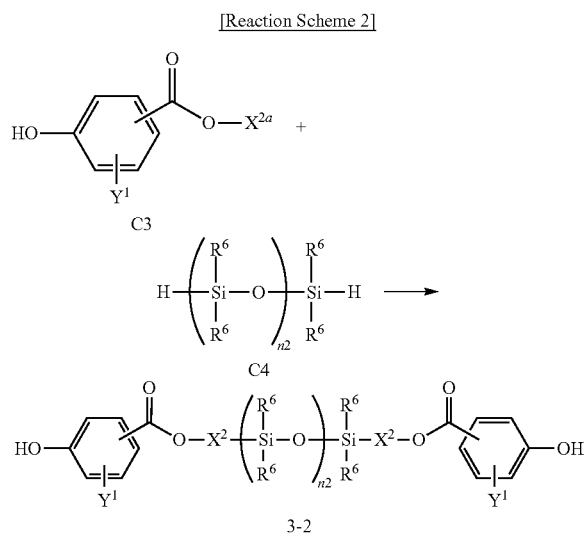

3-2 wherein, in Reaction Scheme 2,
$X^{2a}$ is a $C_{2-10}$ alkenyl, and
$X^2$, $Y^1$, $R^6$, and n2 are respectively the same as previously defined in Chemical Formula 3 above.

In Reaction Scheme 1 and Reaction Scheme 2, the reaction may be preferably conducted in the presence of a metal catalyst.

As the metal catalyst, a platinum (Pt) catalyst may be preferably used. The Pt catalyst may include at least one selected from the group consisting of an Ashby catalyst, a Karstedt catalyst, a Lamoreaux catalyst, a Speier catalyst, $PtCl_2$ (COD), $PtCl_2$(benzonitrile)$_2$, and $H_2PtBr_6$.

The metal catalyst may have an amount of 0.001 parts by weight or more, 0.005 parts by weight or more, or 0.01 parts by weight or more, and 1 part by weight or less, 0.1 parts by weight or less, or 0.05 parts by weight or less, based on 100 parts by weight of the compound represented by Chemical Formula 11, 13, or 15.

Further, the reaction temperature is preferably 80° C. to 100° C.

In addition, the reaction time is preferably 1 to 5 h.

In addition, in Reaction Schemes 1 and 2, the compound represented by Chemical Formula C2 or C4 may be prepared by reaction of organodisiloxane and organocyclosiloxane in the presence of an acid catalyst, and n1 and n2 may be controlled by controlling amounts of the reaction materials.

The reaction temperature is preferably 50° C. to 70° C.

In addition, the reaction time is preferably 1 to 6 h.

As the organodisiloxane, at least one selected from the group consisting of tetramethyldisiloxane, tetraphenyldisiloxane, hexamethyldisiloxane, and hexaphenyldisiloxane may be used.

In addition, as the organocyclosiloxane, for example, an organocyclotetrasiloxane may be used. Examples of the organocyclotetrasiloxane may include octamethylcyclotetrasiloxane, octaphenylcyclotetrasiloxane, etc.

The organodisiloxane may have an amount of 0.1 parts by weight or more, or 2 parts by weight or more, and 10 parts by weight or less, or 8 parts by weight or less, based on 100 parts by weight of the organocyclosiloxane.

As the acid catalyst, at least one selected from the group consisting of $H_2SO_4$, $HClO_4$, $AlCl_3$, $SbCl_5$, $SnCl_4$, and acid clay may be used.

Further, the acid catalyst may have an amount of 0.1 parts by weight or more, 0.5 parts by weight or more, or 1 part by weight or more, and 10 parts by weight or less, 5 parts by weight or less, or 3 parts by weight or less, based on 100 parts by weight of the organocyclosiloxane.

Physical properties of the copolycarbonate resin may be improved by controlling the amounts of the repeating units represented by Chemical Formulas 2 and 3.

Here, the weight ratio of the repeating units corresponds to a weight ratio of the siloxane compounds used for polymerization of the copolycarbonate, for example, a weight ratio of the siloxane compounds represented by Chemical Formulas 2-2 and 3-2.

[Composition and Manufacturing Method of Copolycarbonate Resin]

In the copolycarbonate resin, a molar ratio of the aromatic polycarbonate-based first repeating unit and one or more aromatic polycarbonate-based second repeating unit having siloxane bonds may be 1:0.0001 to 1:0.01, or 1:0.0005 to 1:0.008, or 1:0.001 to 1:0.006, and a weight ratio of the aromatic polycarbonate-based first repeating unit and one or more aromatic polycarbonate-based second repeating unit having siloxane bonds may be 1:0.001 to 1:1, or 1:0.005 to 1:0.1, or 1:0.01 to 1:0.03.

In addition, the copolycarbonate resin may include 90 wt % to 99.999 wt % of the first repeating unit and 0.001 wt % to 10 wt % of the second repeating unit.

That is, when the amount of the second repeating unit is excessively decreased, it is difficult to sufficiently implement improvement in physical properties such as room temperature impact strength, low temperature impact strength, and fluidity according to the second repeating unit.

Meanwhile, when the amount of the second repeating unit is excessively increased, fluidity and molding processability may be decreased while excessively increasing the molecular weight of the copolycarbonate resin.

In addition, the copolycarbonate resin may have a weight average molecular weight of 1,000 to 100,000 g/mol, preferably, 5,000 to 50,000 g/mol.

Within the range of the weight average molecular weight, appropriate ductility and appropriate YI of the copolycarbonate resin may be secured.

More preferably, the weight average molecular weight (g/mol) is 1,000 or more, 5,000 or more, 10,000 or more, 21,000 or more, 22,000 or more, 23,000 or more, 24,000 or more, 25,000 or more, 26,000 or more, 27,000 or more, or 28,000 or more.

Further, the weight average molecular weight is 100,000 or less, 50,000 or less, 34,000 or less, 33,000 or less, or 32,000 or less.

The amount of the copolycarbonate resin may vary depending on physical properties that are attempted to be controlled in the composition.

For example, the copolycarbonate resin may have an amount of 10 parts by weight to 100 parts by weight based on 100 parts by weight of the polycarbonate resin.

Preferably, the amount of the copolycarbonate resin is 10 parts by weight or more, 15 parts by weight or more, or 18 parts by weight or more.

In addition, the amount of the copolycarbonate resin is 100 parts by weight or less, or 75 parts by weight or less, or 60 parts by weight or less, or 55 parts by weight or less, or 45 parts by weight or less, or 30 parts by weight or less.

That is, in order to have the effect in which physical properties are improved, the copolycarbonate resin may preferably have an amount of 10 parts by weight or more, or 15 parts by weight or more, or 18 parts by weight or more, based on 100 parts by weight of the polycarbonate resin.

Meanwhile, when the copolycarbonate is added in an excess amount, transparency of the composition may be deteriorated, and an effect in which heat resistance and impact strength are improved may reach a threshold value, or may be deteriorated.

Therefore, the copolycarbonate resin is preferably included in an amount of 100 parts by weight or less, or 75 parts by weight or less, or 60 parts by weight or less, or 55 parts by weight or less, or 45 parts by weight or less, or 30 parts by weight or less, based on 100 parts by weight of the polycarbonate resin.

Meanwhile, according to an exemplary embodiment of the present invention, the copolycarbonate resin may be prepared by using the above-described aromatic diol compound, the carbonate precursor, and at least one siloxane compound.

At the time of polymerizing the compounds, the at least one siloxane compound may have an amount of 0.1 wt % or more, 0.5 wt % or more, 1 wt % or more, or 1.5 wt % or more, and 20 wt % or less, 10 wt % or less, 7 wt % or less, 5 wt % or less, 4 wt % or less, 3 wt % or less, or 2 wt % or less, based on 100 wt % in total of the aromatic diol compound, the carbonate precursor, and the at least one siloxane compound.

In addition, the aromatic diol compound may have an amount of 40 wt % or more, 50 wt % or more, or 55 wt % or more, and 80 wt % or less, 70 wt % or less, or 65 wt % or less, based on 100 wt % in total of the aromatic diol compound, the carbonate precursor, and the at least one siloxane compound.

In addition, the carbonate precursor may have an amount of 10 wt % or more, 20 wt % or more, or 30 wt % or more, and 60 wt % or less, 50 wt % or less, or 40 wt % or less, based on 100 wt % in total of the aromatic diol compound, the carbonate precursor, and the at least one siloxane compound.

In addition, as the polymerization method, an interfacial polymerization method may be used as one example. In this case, the polymerization reaction may be carried out at a low temperature under atmospheric pressure, and may easily control a molecular weight.

The interfacial polymerization may be preferably conducted in the presence of an acid binder and an organic solvent.

Furthermore, the interfacial polymerization may include, for example, steps of conducting pre-polymerization, then adding a coupling agent and conducting polymerization again. In this case, a copolycarbonate having a high molecular weight may be obtained.

The materials used in the interfacial polymerization are not particularly limited as long as they may be used in polymerization of polycarbonates. The use amount thereof may be adjusted as required.

The acid binder may include, for example, alkali metal hydroxides such as sodium hydroxide, potassium hydroxide, etc., or amine compounds such as pyridine, etc.

The organic solvent is not particularly limited as long as it is a solvent that is usually used in the polymerization of polycarbonates. As one example, halogenated hydrocarbons such as methylene chloride, chlorobenzene, etc., may be used.

Further, during the interfacial polymerization, a reaction accelerator, for example, a tertiary amine compound such as triethylamine, tetra-n-butylammonium bromide, tetra-n-butylphosphonium bromide, or the like, a quaternary ammonium compound, a quaternary phosphonium compound, or the like, may be further used for accelerating the reaction.

In the interfacial polymerization, the reaction temperature may be preferably 0 to 40° C., and the reaction time may be preferably 10 min to 5 h.

Further, during the interfacial polymerization reaction, pH may be preferably maintained at 9 or more, or 11 or more.

In addition, the interfacial polymerization reaction may be carried out by further including a molecular weight modifier.

The molecular weight modifier may be added before the initiation of polymerization, during the initiation of polymerization, or after the initiation of polymerization.

As the molecular weight modifier, a mono-alkyl phenol may be used. As one example, the mono-alkyl phenol is at least one selected from the group consisting of p-tert-butyl phenol, p-cumyl phenol, decyl phenol, dodecyl phenol, tetradecyl phenol, hexadecyl phenol, octadecyl phenol, eicosyl phenol, docosyl phenol, and triacontyl phenol. Preferably, the mono-alkyl phenol may be p-tert-butylphenol, and in this case, the effect of adjusting the molecular weight is great.

The molecular weight modifier may have an amount of 0.01 parts by weight or more, 0.1 parts by weight or more, or 1 part by weight or more, and 10 parts by weight or less, 6 parts by weight or less, or 5 parts by weight or less, based on 100 parts by weight of the aromatic diol compound. Within the range as described above, a desired molecular weight may be obtained.

(3) Flame Retardant

The polycarbonate-based resin composition according to an exemplary embodiment of the present invention includes a flame retardant.

Preferably, the flame retardant may be an organic metal salt-based flame retardant.

Specifically, the organic metal salt-based flame retardant may be at least one compound selected from the group consisting of sulfonic acid alkali metal salts and sulfonic acid alkaline earth metal salts.

For example, examples of the alkali metal may include lithium, sodium, potassium, rubidium, and cesium; and examples of alkaline earth metal may include beryllium, magnesium, calcium, strontium, and barium.

As a non-limiting example, the organic metal salt-based flame retardant may preferably be a perfluoroalkyl sulfonic acid alkali metal salt.

Specifically, the perfluoroalkyl sulfonic acid alkali metal salt may be at least one compound selected from the group consisting of trifluoromethanesulfonic acid calcium, pertluorobutanesulfonic acid potassium, perfluorohexanesulfonic acid potassium, perfluorooctanesulfonic acid potassium, pentafluoroethanesulfonic acid sodium, perfluorobutanesulfonic acid sodium, perfluorooctanesulfonic acid sodium, trifluoromethanesulfonic acid lithium, perfluorobutanesulfonic acid lithium, perfluoroheptanesulfonic acid lithium, trifluoromethanesulfonic acid cesium, perfluorobutanesulfonic acid cesium, perfluorooctanesulfonic acid cesium, perfluorohexanesulfonic acid cesium, perfluorobutanesulfonic acid rubidium, and perfluorohexanesulfonic acid rubidium.

Among them, perfluorobutanesulfonic acid potassium may be particularly and preferably used.

Meanwhile, the flame retardant may be included at 0.01 parts by weight to 10 parts by weight based on 100 parts by weight of the polycarbonate resin.

Preferably, the flame retardant may have an amount of 0.01 parts by weight or more, or 0.05 parts by weight or more, or 0.1 parts by weight or more, based on 100 parts by weight of the polycarbonate resin.

In addition, the flame retardant may have an amount of 10 parts by weight or less, or 5 parts by weight or less, or 3 parts by weight or less, or 1 part by weight or less, based on 100 parts by weight of the polycarbonate resin.

That is, in order to have flame retardancy, the flame retardant may have an amount of 0.01 parts by weight or more, or 0.05 parts by weight or more, or 0.1 parts by weight or more, based on 100 parts by weight of the polycarbonate resin.

Meanwhile, when the flame retardant is added in an excess amount, heat resistance and mechanical physical properties of the resin composition may be rapidly deteriorated, and accordingly, the phosphoric acid ester-based flame retardant preferably has an amount of 10 parts by weight or less, or 5 parts by weight or less, or 3 parts by weight or less, or 1 part by weight or less, based on 100 parts by weight of the polycarbonate resin.

Further, it is preferable to control the amount of the flame retardant within a range in which an effect for improving heat resistance and impact strength according to the addition of the copolycarbonate resin is not inhibited.

Specifically, the flame retardant may be included at 0.1 parts by weight to 10 parts by weight based on 100 parts by weight of the copolycarbonate resin.

Preferably, the flame retardant may have an amount of 0.1 parts by weight or more, or 0.5 parts by weight or more, based on 100 parts by weight of the copolycarbonate resin.

In addition, the flame retardant may have an amount of 10 parts by weight or less, or 5 parts by weight or less, or 3 parts by weight or less, or 1 part by weight or less, based on 100 parts by weight of the copolycarbonate resin.

(4) Other Components

The flame resistant polycarbonate-based resin composition according to an exemplary embodiment of the present invention may further include additives such as an impact modifier such as a methacrylate/butadiene/styrene (MBS) copolymer or a acrylonitrile/butadiene/styrene (ABS) copolymer; a drip inhibitor such as polytetrafluoroethylene (PTFE); a surfactant; a nucleating agent; a coupling agents; a filler; a plasticizer; a lubricant; an antimicrobial; a release agent; a heat stabilizer; an antioxidant; a UV stabilizer; a compatibilizer; a colorant; an antistatic agent; a pigment; a dye; a flame retardant, etc., as needed Amounts of the additives may vary depending on physical properties that are attempted to be provided in the composition.

For example, the additives may have an amount of 0.01 parts by weight to 10 parts by weight based on 100 parts by weight of the polycarbonate resin, respectively.

Meanwhile, in order to prevent deterioration of heat resistance, impact strength, flame retardancy, etc., of the flame resistant polycarbonate-based resin composition by the inclusion of the additives, a total amount of the additives is preferably 20 parts by weight or less, 15 parts by weight or less, or 10 parts by weight or less based on 100 parts by weight of the polycarbonate resin.

II. Polycarbonate-Based Resin Molded Articles

According to another exemplary embodiment of the present invention, molded articles formed from the above-described flame resistant polycarbonate-based resin composition are provided.

The molded articles are products obtained by molding the above-described polycarbonate-based resin composition used as a raw material by an extrusion method, an injection method, a casting method, etc.

The molding method or the condition thereof may be appropriately selected and controlled according to kinds of the molded articles.

As non-limiting example, the molded article may be obtained by mixing and extrusion-molding the polycarbonate-based resin composition into a pellet, and drying and injection-molding the pellet.

Particularly, the molded articles may be formed from the polycarbonate-based resin composition to have high flame retardancy of a V-O rating according to a UL 94 V Test while having excellent heat resistance and impact strength.

Advantageous Effects

The polycarbonate-based resin composition according to the present invention and the molded articles thereof may have high flame retardancy of a V-O rating according to the UL 94 V Test while having excellent heat resistance and impact strength.

DETAILED DESCRIPTION OF THE EMBODIMENTS

Hereinafter, preferable examples of the present invention will be provided for better understanding of the present invention.

However, the following examples are provided only for illustration of the present invention, and should not be construed as limiting the present invention.

Preparation Example 1

Preparation of Polyorganosiloxane (AP-PDMS, n=34)

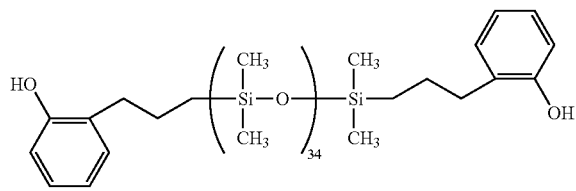

After 47.6 g (160 mmol) of octamethylcyclotetrasiloxane and 2.4 g (17.8 mmol) of tetramethyldisiloxane were mixed with each other, the mixture was placed in a 3 L flask with 1 part by weight of acid clay (DC-A3) based on 100 parts by weight of octamethylcyclotetrasiloxane, and reacted at 60° C. for 4 h.

After the reaction was terminated, the mixture was diluted with ethylacetate and quickly filtered using Celite.

The number of repeating units (n1) of the unmodified polyorganosiloxane obtained as described above was 34 when confirmed through $^1$H NMR.

4.81 g (35.9 mmol) of 2-allylphenol and 0.01 g (50 ppm) of Karstedt's platinum catalyst were added to the obtained terminal-unmodified polyorganosiloxane and reacted at 90° C. for 3 h.

After the reaction was terminated, the unreacted polyorganosiloxane was removed by evaporation under conditions of 120° C. and 1 torr.

The terminal-modified polyorganosiloxane obtained as described above was designated as AP-PDMS n1=34.

The AP-PDMS was a pale yellow oil, the repeating unit (n1) was 34 when confirmed through $^1$H NMR using Varian 500 MHz, and further purification was not required.

Preparation Example 2

Preparation of Polyorganosiloxane (MBHB-PDMS, n2=58)

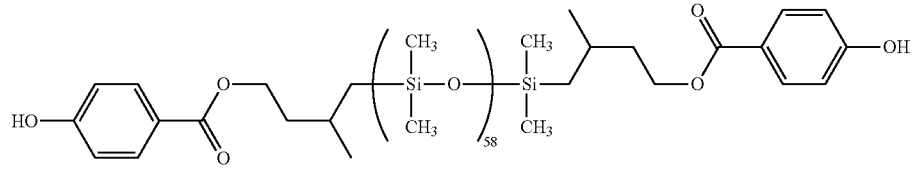

After 47.60 g (160 mmol) of octamethylcyclotetrasiloxane and 1.5 g (11 mmol) of tetramethyldisiloxane were mixed with each other, the mixture was placed in a 3 L flask with 1 part by weight of acid clay (DC-A3) based on 100 parts by weight of octamethylcyclotetrasiloxane, and reacted at 60° C. for 4 h.

After the reaction was terminated, the reaction product was diluted with ethylacetate and quickly filtered using Celite.

The repeating unit (n2) of the terminal unmodified polyorganosiloxane obtained as described above was 58 when confirmed through $^1$H NMR.

6.13 g (29.7 mmol) of 3-methylbut-3-enyl 4-hydroxybenzoate and 0.01 g (50 ppm) of Karstedt's platinum catalyst were added to the obtained terminal-unmodified polyorganosiloxane and reacted at 90° C. for 3 h.

After the reaction was terminated, the unreacted polyorganosiloxane was removed by evaporation under conditions of 120° C. and 1 torr.

The terminal-modified polyorganosiloxane obtained as described above was designated as MBHB-PDMS n2=58.

The MBHB-PDMS was a pale yellow oil, the repeating unit (n2) was 58 when confirmed through $^1$H NMR using Varian 500 MHz, and further purification was not required.

Preparation Example 3

Preparation of Copolycarbonate Resin 1784 g of water, 385 g of NaOH and 232 g of BPA (bisphenol A) were added to a polymerization reactor, and dissolved while mixing under a N$_2$ atmosphere.

4.3 g of para-tert butylphenol (PTBP) and a mixed solution of 4.72 g of AP-PDMS n1=34 prepared by Preparation Example 1 and 0.52 g of MBHB-PDMS n2=58 prepared by Preparation Example 2 were dissolved in methylene chloride (MC), and then added to the above-prepared mixture.

Subsequently, 128 g of TPG (triphosgene) was dissolved in MC and the dissolved TPG solution was added to the mixture and reacted for 1 h while maintaining pH at 11 or more. After 10 min, 46 g of TEA (triethylamine) was added thereto to carry out a coupling reaction.

After a total reaction time of 1 h and 20 min, TEA was removed by lowering the pH to pH 4, and then the pH of the produced polymer was adjusted to neutral pH of 6 to 7 by washing three times with distilled water.

The obtained polymer was re-precipitated in a mixed solution of methanol and hexane, and dried at 120° C. to obtain a final copolycarbonate resin (Mw=30,500).

Preparation Example 4

(1) 1784 g of water, 385 g of NaOH, and 232 g of BPA (bisphenol A) were added to a polymerization reactor, and dissolved while mixing under a N$_2$ atmosphere.

Subsequently, 128 g of TPG (triphosgene) was dissolved in MC and the dissolved TPG solution was added to the mixture and reacted for 1 h while maintaining pH at 11 or more. After 10 min, 46 g of TEA (triethylamine) was added thereto to carry out a coupling reaction.

After a total reaction time of 1 h and 20 min, TEA was removed by lowering the pH to pH 4, and then the pH of the produced polymer was adjusted to neutral pH of 6 to 7 by washing three times with distilled water.

The obtained polymer was re-precipitated in a mixed solution of methanol and hexane, and dried at 120° C. to obtain a final polycarbonate resin (Mw=31000; MI=10 g/10 min at a temperature of 300° C. and a load of 1.2 kg).

(2) 1784 g of water, 385 g of NaOH, and 232 g of BPA (bisphenol A) were added to a polymerization reactor, and dissolved while mixing under a N$_2$ atmosphere.

Subsequently, 128 g of TPG (triphosgene) was dissolved in MC and the dissolved TPG solution was added to the mixture and reacted for 1 h while maintaining pH at 11 or more. After 10 min, 46 g of TEA (triethylamine) was added thereto to carry out a coupling reaction.

After a total reaction time of 1 h and 20 min, TEA was removed by lowering the pH to 4, and then the pH of the produced polymer was adjusted to neutral pH of 6 to 7 by washing three times with distilled water.

The obtained polymer was re-precipitated in a mixed solution of methanol and hexane, and dried at 120° C. to obtain a final polycarbonate resin (Mw=26000; MI=22 g/10 min at a temperature of 300° C. and a load of 1.2 kg).

Examples and Comparative Examples

Pellets were manufactured by adding respective components according to the composition of Table 1 below, followed by melting and kneading extrusion.

The manufactured pellets were dried at 70° C. for 6 h, followed by injection-molding, to manufacture samples for evaluating physical properties.

The components used in each of examples and comparative examples are provided as follows.

(A-1) Polycarbonate resin according to Preparation Example 4 (MI10 g/10 min)

(A-2) Polycarbonate resin according to Preparation Example 4 (MI22 g/10 min)

(B-1) Copolycarbonate resin according to Preparation Example 3 (PC 8000-05, LG Chem.)

(C-1) Organic metal salt-based flame retardant (HX98, MITENI S.p.A.)

(C-2) Organic phosphorus-based flame retardant (FP-600, ADEKA Co.)

(C-3) Organic phosphorus-based flame retardant (PX-200, DAIHACHI CHEMICAL INDUSTRY Co., Ltd.)

(D-1) Impact modifier (MBS copolymer, EM505, LG Chem.)

(D-2) Impact modifier (ABS copolymer, AT-05, NIPPON A&L)

(D-3) Drip inhibitor (PTFE, XFLON-G, POCERA Co.)

(D-4) Antioxidant (SONGNOX 1076, SONGWON Co.)

(D-5) Antioxidant (PEP-36, ADEKA Co.)

(D-6) Lubricant (Licowax E, CLARIANT)

(D-7) UV stabilizer (TINUVIN 329, BASF)

TABLE 1

|   | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| A-1 | 30 | 29.85 | 20 | 20 | 40 | 40 | 40 | 30 | 20 |
| A-2 | 52 | 52 | 57 | 56.85 | 52.4 | 57 | 56.85 | 33.1 | 53.4 |
| B-1 | 15 | 15 | 20 | 20 | — | — | — | 30 | 20 |
| C-1 | 0.1 | 0.15 | 0.1 | 0.15 | — | 0.1 | 0.15 | — | — |
| C-2 | — | — | — | — | — | — | — | — | 3.2 |
| C-3 | — | — | — | — | 3.2 | — | — | 2.5 | — |
| D-1 | 2 | 2 | 2 | 2 | 3 | 2 | 2 | — | 2 |
| D-2 | — | — | — | — | — | — | — | 3 | — |
| D-3 | 0.2 | 0.3 | 0.2 | 0.3 | 0.7 | 0.2 | 0.3 | 0.7 | 0.7 |
| D-4 | 0.1 | 0.1 | 0.1 | 0.1 | 0.1 | 0.1 | 0.1 | 0.1 | 0.1 |
| D-5 | 0.05 | 0.05 | 0.05 | 0.05 | 0.05 | 0.05 | 0.05 | 0.05 | 0.05 |
| D-6 | 0.5 | 0.5 | 0.5 | 0.5 | 0.5 | 0.5 | 0.5 | 0.5 | 0.5 |
| D-7 | 0.05 | 0.05 | 0.05 | 0.05 | 0.05 | 0.05 | 0.05 | 0.05 | 0.05 |

Test Example

Physical properties of each sample formed from each composition of examples and comparative examples were measured by the following methods, and results thereof were shown in Table 2 below.

(1) Impact Strength (IZOD): measured with ¼ inch (Notched Izod, kg·cm/cm) and ⅛ inch (Notched Izod, kg·cm/cm) at 23° C. in accordance with ASTM D256.

(2) Melt Index (MI): measured in accordance with ASTM D1238 (under conditions of 300° C. and 1.2 kg).

(3) Tensile Strength (TS) and Tensile Elongation (TE): measured in accordance with ASTM D638 (50 mm/min).

(4) Flexural Modulus (FM) and Flexural Strength (FS): measured in accordance with ASTM D790 (10 mm/min).

(5) Heat Distortion Temperature (HDT): measured in accordance with ASTM D648 (18.5 kgf, 120° C./h).

(6) Flame Resistance Rating: measured in accordance with UL 94 V Test (vertical burning test, 1.6 mm) standard.

TABLE 2

|   | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| IZOD (1/4") | 62.2 | 59.0 | 65.0 | 59.1 | 14.7 | 15.3 | 14.6 | 12.2 | 14.0 |
| IZOD (1/8") | 87.2 | 82.3 | 84.6 | 82.6 | 78.0 | 80.6 | 80.3 | 79.0 | 81.2 |

TABLE 2-continued

|  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| MI | 17.7 | 17.6 | 18.4 | 18.3 | 17.1 | 19.2 | 18.9 | 13.7 | 17.8 |
| TS | 607 | 599 | 603 | 599 | 630 | 615 | 612 | 637 | 636 |
| TE | 129.9 | 120.5 | 114.0 | 118.5 | 125.0 | 117.1 | 120.4 | 142.5 | 123.2 |
| FM | 23848 | 23789 | 23563 | 23512 | 25435 | 25395 | 25800 | 25725 | 25536 |
| FS | 971 | 970 | 973 | 972 | 1026 | 1007 | 1018 | 1038 | 1022 |
| HDT | 127.1 | 127.1 | 126.8 | 126.9 | 118.4 | 128.2 | 128.6 | 116.6 | 117.4 |
| Flame resistance Rating | V-0 | V-0 | V-0 | V-0 | V-0 | V-0 | V-0 | V-0 | V-0 |

As shown in Table 1 above, it was confirmed that the polycarbonate-based resin compositions according to Examples 1 and 2 had excellent heat resistance and impact strength while having flame retardancy of a V-O rating according to the UL 94 V Test.

The invention claimed is:

1. A flame resistant polycarbonate-based resin composition comprising:
   a polycarbonate resin including an aromatic polycarbonate-based first repeating unit;
   a copolycarbonate resin including the aromatic polycarbonate-based first repeating unit and one or more aromatic polycarbonate-based second repeating unit having siloxane bonds; and
   an organic metal salt-based flame retardant,
   wherein each first repeating unit independently includes a repeating unit represented by Chemical Formula 1 below; and
   the second repeating unit includes a repeating unit represented by Chemical Formula 3 below:

[Chemical Formula 1]

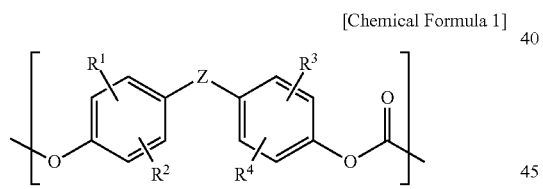

wherein, in Chemical Formula 1,
$R^1$ to $R^4$ are each independently hydrogen, a $C_{1-10}$ alkyl, a $C_{1-10}$ alkoxy, or a halogen, and
Z is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO;

[Chemical Formula 3]

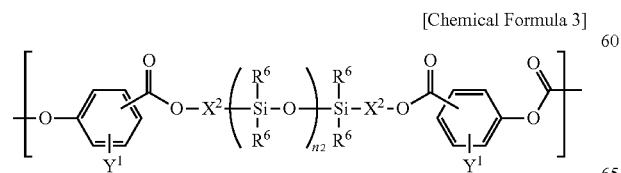

wherein, in Chemical Formula 3,
each $X^2$ is independently a $C_{1-10}$ alkylene,
each $Y^1$ is independently hydrogen, a $C_{1-6}$ alkyl, a halogen, a hydroxy, a $C_{1-6}$ alkoxy, or a $C_{6-20}$ aryl,
each $R^6$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and
n2 is an integer of 10 to 200.

2. The flame resistant polycarbonate-based resin composition of claim 1, wherein
the repeating unit represented by Chemical Formula 1 is represented by Chemical Formula 1-1 below:

[Chemical Formula 1-1]

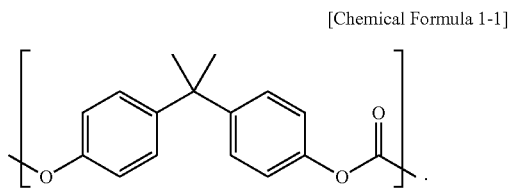

3. The flame resistant polycarbonate-based resin composition of claim 1, wherein the repeating unit represented by Chemical Formula 3 is represented by Chemical Formula 3-1 below:

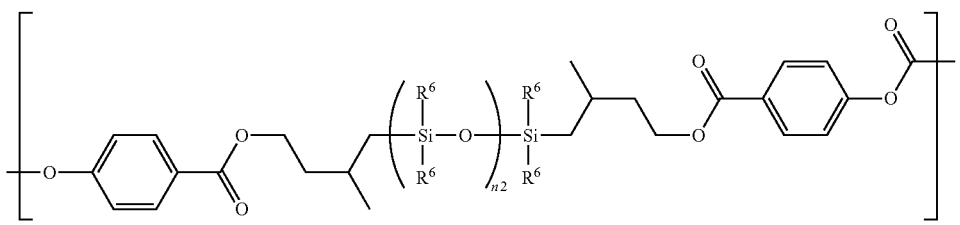

[Chemical Formula 3-1]

wherein, in Chemical Formula 3-1,
$R^6$ and n2 are respectively the same as previously defined in Chemical Formula 3 above.

4. The flame resistant polycarbonate-based resin composition of claim 1, wherein the second repeating unit includes a repeating unit represented by Chemical Formula 2 below and the repeating unit represented by Chemical Formula 3 below:

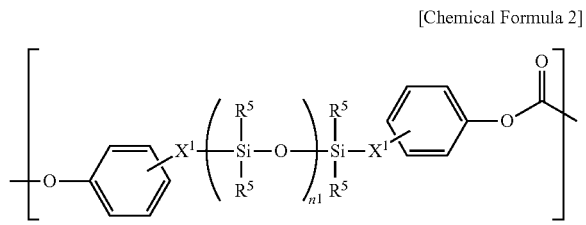

[Chemical Formula 2]

wherein, in Chemical Formula 2,
each $X^1$ is independently a $C_{1-10}$ alkylene,
each $R^5$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and
n1 is an integer of 10 to 200.

5. The flame resistant polycarbonate-based resin composition of claim 4, wherein the repeating unit represented by Chemical Formula 2 is represented by Chemical Formula 2-1 below:

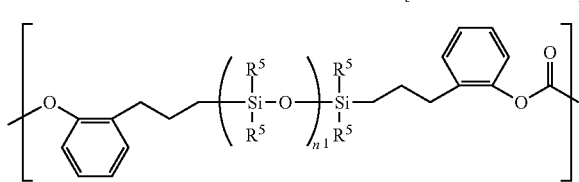

[Chemical Formula 2-1]

wherein, in Chemical Formula 2-1,
$R^5$ and n1 are respectively the same as previously defined in Chemical Formula 2 above.

6. The flame resistant polycarbonate-based resin composition of claim 1, wherein the polycarbonate resin has a melt index (MI) of 5 g/10 min to 25 g/10 min at a temperature of 300° C. and a load of 1.2 kg.

7. The flame resistant polycarbonate-based resin composition of claim 1, wherein the polycarbonate resin includes at least two polycarbonate resins each having a different melt index (MI).

8. The flame resistant polycarbonate-based resin composition of claim 1, wherein the polycarbonate resin includes 150 to 350 parts by weight of a second polycarbonate resin based on 100 parts by weight of a first polycarbonate resin, and the second polycarbonate resin has a larger melt index than that of the first polycarbonate resin.

9. The flame resistant polycarbonate-based resin composition of claim 1, wherein the copolycarbonate resin includes 90 wt % to 99.999 wt % of the first repeating unit and 0.001 wt % to 10 wt % of the second repeating unit.

10. The flame resistant polycarbonate-based resin composition of claim 1, wherein the polycarbonate resin and the copolycarbonate resin have a weight average molecular weight of 1,000 to 100,000 g/mol, respectively.

11. The flame resistant polycarbonate-based resin composition of claim 1, wherein the organic metal salt-based flame retardant is at least one compound selected from the group consisting of sulfonic acid alkali metal salts and sulfonic acid alkaline earth metal salts.

12. The flame resistant polycarbonate-based resin composition of claim 1, wherein the flame resistant polycarbonate-based resin composition includes 10 to 100 parts by weight of the copolycarbonate resin, and 0.01 to 10 parts by weight of the organic metal salt-based flame retardant, based on 100 parts by weight of the polycarbonate resin.

13. Molded articles formed from the flame resistant polycarbonate-based resin composition of claim 1.

* * * * *